United States Patent [19]
Aboaf et al.

[11] Patent Number: 5,296,993
[45] Date of Patent: Mar. 22, 1994

[54] MAGNETIC HEAD WITH MAGNETIC SUBSTRATE AND AN ENHANCED POLETIP THEREON

[75] Inventors: Joseph A. Aboaf; Edward V. Denison; Vincent N. Kahwaty; Gerald Steving, all of Tucson, Ariz.

[73] Assignee: International Business Machines Corporation, Armonk, N.Y.

[21] Appl. No.: 29,346

[22] Filed: Mar. 10, 1993

Related U.S. Application Data

[60] Continuation of Ser. No. 881,286, May 11, 1992, abandoned, which is a division of Ser. No. 694,611, May 2, 1991, Pat. No. 5,142,768.

[51] Int. Cl.$^5$ .................. G11B 5/187; G11B 5/23; G11B 5/31
[52] U.S. Cl. ............................................. 360/126
[58] Field of Search ....................... 360/126, 120, 122

[56] References Cited

U.S. PATENT DOCUMENTS

| | | | |
|---|---|---|---|
| 3,829,896 | 8/1974 | Brock et al. | 360/125 |
| 4,241,367 | 12/1980 | Nomura et al. | 360/127 |
| 4,246,620 | 1/1981 | Kaminaka et al. | 360/127 |
| 4,490,760 | 12/1984 | Kaminaka et al. | 360/126 |
| 4,716,484 | 12/1987 | Kaminaka et al. | 360/125 |
| 4,797,765 | 1/1989 | Ezaki et al. | 360/110 |
| 4,875,987 | 10/1989 | Wada et al. | 204/192 |
| 4,943,883 | 7/1990 | Sano et al. | 360/126 |
| 4,951,166 | 8/1990 | Schewe | 360/119 |
| 5,016,341 | 5/1991 | Ogawa et al. | 29/603 |
| 5,130,877 | 7/1992 | Hsie et al. | 360/126 |

OTHER PUBLICATIONS

IBM Technical Disclosure Bulletin, vol. 15, No. 7, Dec. 1972, "Electromagnetic Transducer with Thin-Film Pole Pieces".
IBM Technical Disclosure Bulletin, vol. 26, No. 7A, Dec. 1983, "Integrated Magnetoresistive Read Inductive Write Film Magnetic Head Assembly".
IBM Technical Disclosure Bulletin, vol. 20, No. 9, Feb., 1978, "Read/Write Servo Magnetic Head".
IBM Technical Disclosure Bulletin, vol. 19, No. 2, Jul., 1976, "Hybrid Thin Film R/W Head with Bonding by Laser Beam".

*Primary Examiner*—Robert S. Tupper
*Attorney, Agent, or Firm*—M. W. Schecter

[57] ABSTRACT

An interleaved bi-directional magnetic tape head for contact recording can have a poletip enhanced by providing a thin film of a soft magnetic material deposited onto a magnetic ferrite substrate. The second pole piece is a thin film of the soft magnetic material. A closure block of a non-magnetic ceramic encloses the layers together with leveling insulation layers and a deposited activating conductor turns. The stripe poletip deposited onto the magnetic ferrite extends for a distance just short of the first conductor turn and provides a balancing of the saturation moment of the pole pieces and provides for better recording capability, especially when operating in a trailing magnetic ferrite mode.

27 Claims, 5 Drawing Sheets

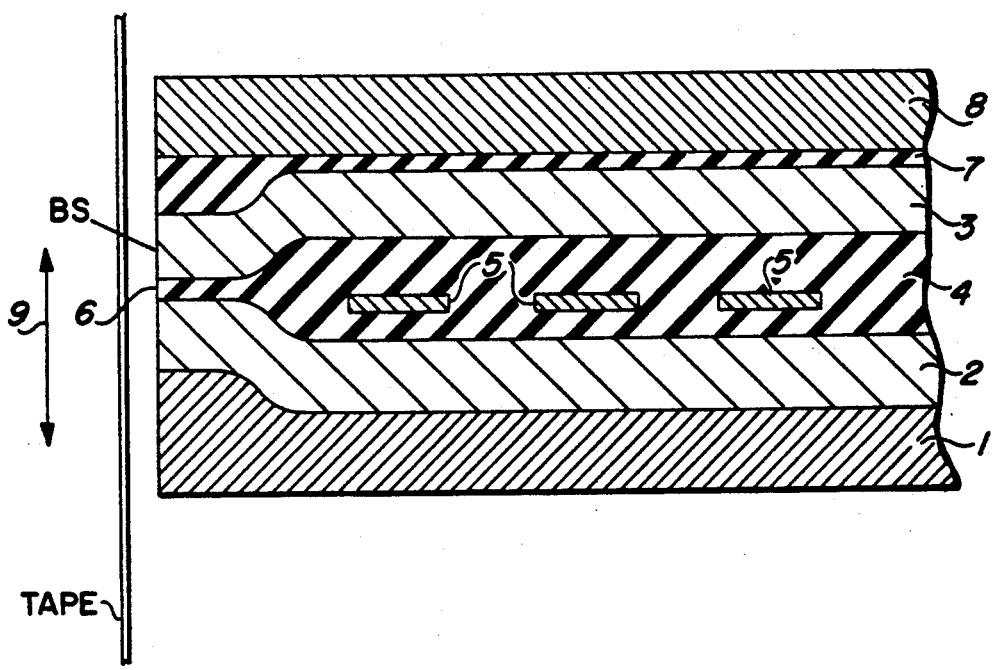
FIG_1A
(PRIOR ART)
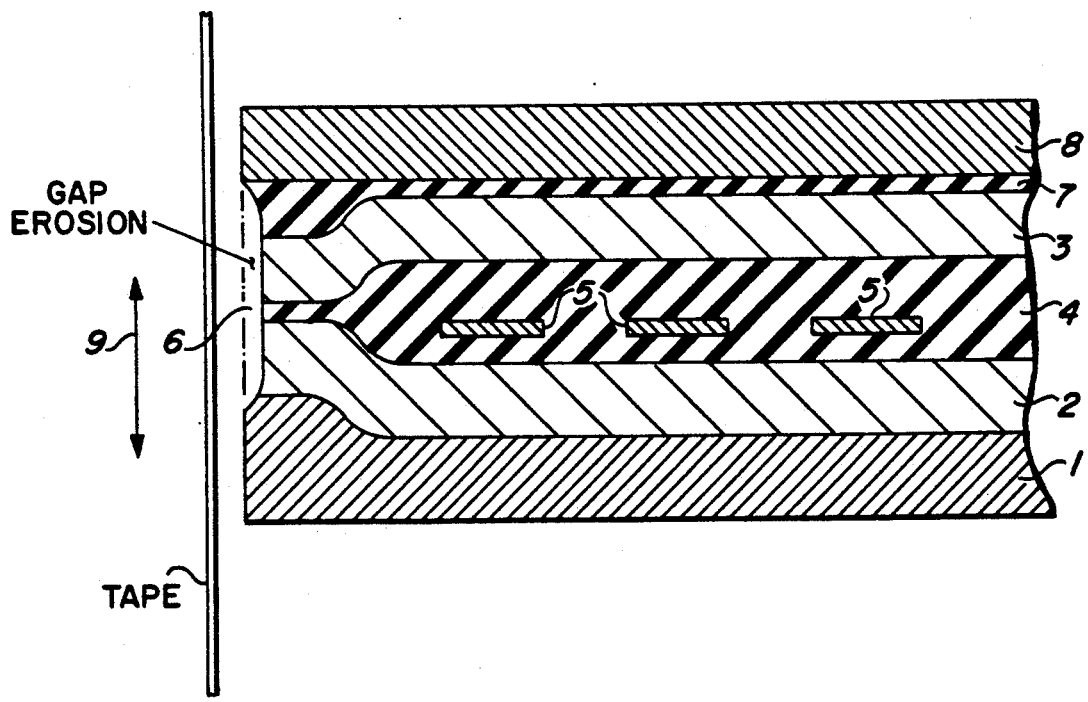
FIG_1B
(PRIOR ART)

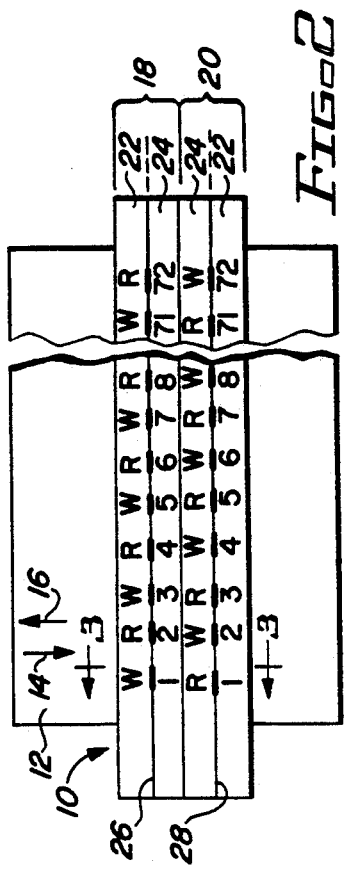
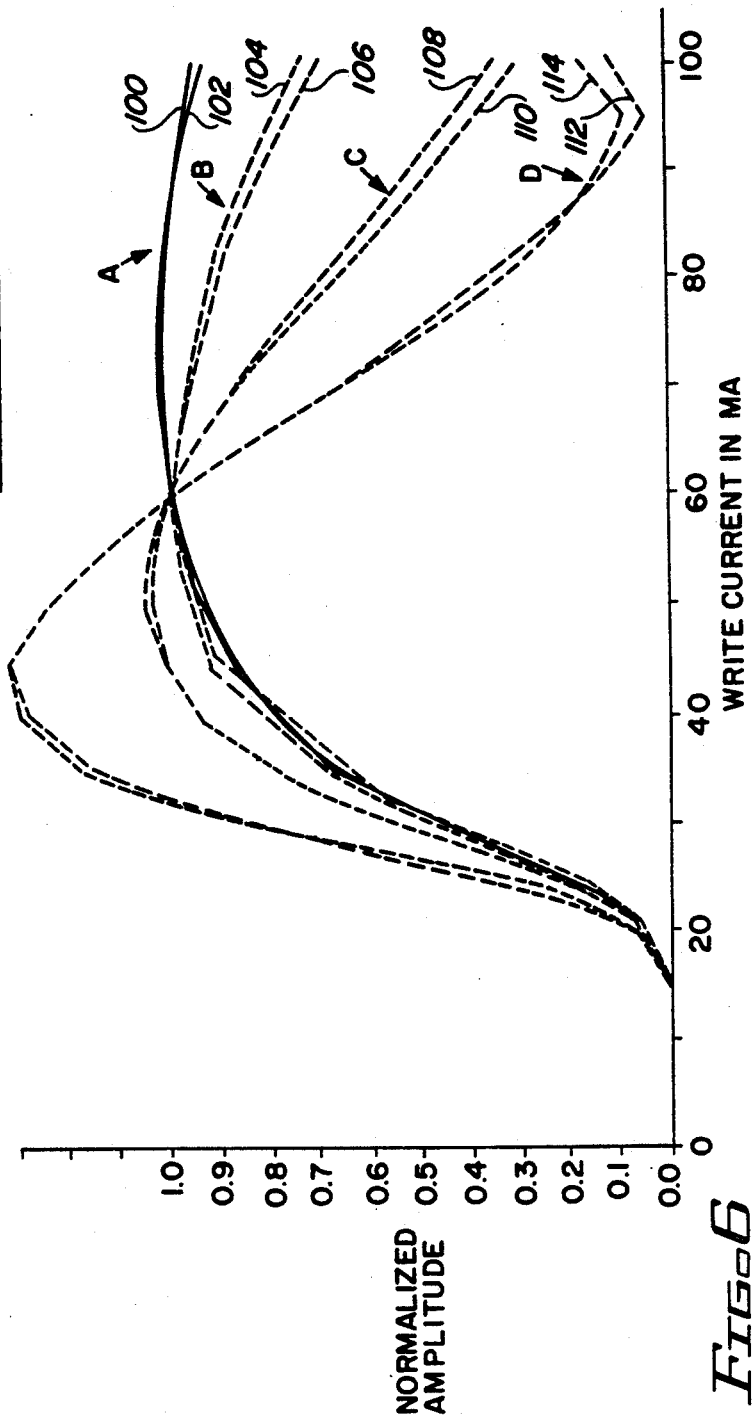

MAGNETIC HEAD WITH MAGNETIC SUBSTRATE AND AN ENHANCED POLETIP THEREON

This application is a continuation of patent application Ser. No. 07/881,286, filed May 11, 1992, now abandoned, which is a divisional of patent application Ser. No. 694,611, filed May 2, 1991, now U.S. Pat. No. 5,142,768.

TECHNICAL FIELD

This invention relates generally to a thin film magnetic head particularly for magnetic recording, and more specifically to a magnetic head with an enhanced poletip for a magnetic ferrite substrate.

BACKGROUND OF THE INVENTION

In high speed data processing systems, magnetic recording has been employed for large memory capacity requirements. Data is read from and written onto the magnetic recordings using magnetic transducers commonly called magnetic heads which are positioned adjacent to the magnetic recording medium. For a contact recording, wherein the magnetic recording medium comes in contact with the magnetic head, the pole pieces are generally made of a magnetic ferrite material because of its wearing characteristics. The magnetic ferrite pole pieces, while having good wearing characteristics for the contact recording particularly with magnetic tape, however, lack the efficiency to record on high coercivity recording medium in the higher data density requirements for present day data recording. Magnetic heads having thin film pole pieces were developed to increase the saturation moment of the pole pieces and to increase the operating efficiency of the transducers, especially in the write or data recording procedure.

Thin film pole pieces, however, while providing the required efficiency to write the higher data density requirements, could not withstand the abrasion of the magnetic recording medium, especially in the contact recording situation. A first order requirement for high density recording is the minimizing of spacing between the surface of the media and the functional recording gap between the pole pieces. With the soft magnetic material thin film poletips of nickel-iron, for instance, the functional recording gap and the poletips are susceptible to wear by the media. Increasing the spacing between the recording gap and the media deteriorates the recording performance.

The write saturation performance characteristics of an interleaved, bi-directional, magnetic head operating in ferrite-trailing mode are not as good as those during operation in poletip-trailing mode. The mode of operation depends on the direction of tape travel: during ferrite-trailing mode, the tape travels across the gap towards the deposited poletip; in poletip-trailing mode, the tape travels towards the ferrite poletip. Regardless of write mode, a head experiences amplitude loss at high write currents. However, because of the lower saturation moment of the ferrite poletip compared to that of the deposited poletip, the amplitude loss is significantly more severe in ferrite-trailing mode. The problem thus presented is how to better balance the saturation moments of the poletips.

FIG. 1A shows a typical conventional thin film magnetic head for use in contact recording on flexible magnetic media, such as magnetic tape. The prior art thin film magnetic head of FIG 1A includes a non-magnetic substrate 1, generally made of a non-magnetic ceramic. A first thin film pole piece 2, generally made of a Permalloy; i.e., a nickel-iron material, is deposited onto the substrate 1. A second thin film pole piece 3 of the same nickel-iron material is deposited onto an insulating layer 4 which encompasses the coil conductors 5 and forms a magnetic gap 6. A support and leveling material 7, generally non-magnetic, is deposited onto the second pole piece 3. The support material 7 is then covered by a non-magnetic closure piece 8. A magnetic tape media moves in a direction as shown by arrow 9 operating in a motion transverse to the pole pieces 2 and 3 over a bearing surface (BS) where the contact recording takes place.

FIG. 1B depicts a likely gap erosion profile on the BS of a standard thin film recording head after wear as a result of the magnetic tape coming in contact at the BS. Referring to FIG 1B, the thin film pole pieces 2 and 3 are soft compared to the ceramic substrate 1 and the ceramic closure 8. The greatest erosion caused by the contact recording is in the functional gap region 6 and is identified as gap erosion. The erosion is generally also great in the support material 7, but generally this area is far enough away from the functional gap region 6 as not to be a primary concern. The effective gap spacing from the bearing surface can easily be several microinches. At a recording density of 2300 flux changes per micrometer, the signal loss for each microinch of spacing is 1.58 decibels. It is, therefore, essential to minimize effective gap erosion to achieve high density recording objectives.

Based on write saturation characteristics, it is best to use a thin film pole piece as the trailing pole piece for the write mode of magnetic heads. The write saturation characteristics in the use of a trailing pole piece of a block of magnetic ferrite material are not as good at short wavelengths, see FIG 1C. In FIG 1D, a curve shows the output amplitude of magnetic transitions when the write current is increased in a thin film trailing pole piece, such as the head of FIG 1A. In FIG 1D, the output amplitude is higher at its peak with approximately 60 milliamperes of write current and has a good output when 100 milliamperes of write current is applied to the head. The ferrite block amplitude output of FIG. 1C is lower at its peak and is essentially zero at a high write current of 100 milliamperes. The degradation of the amplitude output is attributed to the lower saturation moment of the ferrite material as compared to the nickel-iron material normally used for thin film pole pieces. What is needed is a magnetic head that has the wear characteristics of a ferrite block trailing pole piece and the amplitude output of a thin film trailing pole piece.

Prior attempts to lessen the gap erosion include the use of a magnetic ferrite substrate as the first pole piece and a thin film magnetic layer as the second pole piece. This would have the affect of lowering the gap erosion, but balancing the saturation moment of the completely different pole piece materials caused insurmountable problems, especially with the flexible magnetic media that must be operational in both directions and, therefore, must operate in a trailing magnetic ferrite mode.

The present invention, therefore, provides for an improved magnetic head for contact recording that lowers the erosion as a result of the contact at the functional magnetic gap region, while providing pole pieces that have a balanced saturation moment.

SUMMARY OF THE INVENTION

The present invention provides a magnetic recording head, preferably an interleaved transducing head, that has a magnetic transducing gap region that is protected from erosion while having, an enhanced thin film poletip for better recording head operation. The magnetic recording includes two thin film deposited poletips. The additional thin film poletip is deposited directly on a magnetic ferrite substrate that also forms a part of the magnetic circuit. A very thin layer, for example, alumina, can be deposited first on the magnetic ferrite substrate as an etch stop layer, for instance. A soft magnetic material is deposited on the alumina layer and patterned using a photoresist mask and etch cycle to create the additional thin film poletip. The additional poletip extends over the magnetic ferrite pole piece section or can extend part way into the head structure almost reaching the first turn of the coil. The size limitation is mainly dependent on good manufacturing processes to assure an adequate adhesion to the magnetic ferrite substrate and to provide the necessary saturation moment. A magnetic gap layer, coil turns, insulation layers, a second thin film pole piece, support insulation layers and a non-magnetic ceramic layer complete the head structure. By using the same soft magnetic material for both poletips, the saturation moments thereof are balanced, thereby eliminating the excess amplitude loss associated with operation in the magnetic ferrite-trailing mode. In effect, the magnetic head always operates in poletip-trailing mode, regardless of the media direction.

A magnetic recording head, according to the present invention, includes at least one row of transducing elements, separate read and write elements, according to the preferred embodiment, with the read elements produced from stripes of a magnetoresistive (MR) material interleaved with alternating write transducers. A first pole piece of the write transducer is formed from a thin film of magnetic material deposited on a substrate of magnetic ferrite adjacent to the bearing surface (BS) tape interface for a minimum distance for good adhesion to the magnetic ferrite and a required saturation moment which, in the preferred embodiment, is generally just short of a first conductor turn or wider. The second pole piece is a thin film of magnetic material deposited onto the insulation layer forming the magnetic gap and encompassing the conductor turns. The closure block bonded to enclose the pole pieces is made of a non-magnetic ceramic material.

An object of the present invention, therefor provide an enhanced magnetic head.

Another object of the present invention is to provide a contact recording magnetic head which has the efficiency of thin film pole pieces.

A further object of the present invention is to provide an interleaved magnetic head that includes an additional thin film poletip for the write transducer that has the saturation moment of the pole pieces balanced while retaining the close protection of the magnetic gap region by the magnetic ferrite section of the first pole piece.

These and other objects of the present invention will become apparent to those skilled in the art as the description proceeds.

BRIEF DESCRIPTION OF THE DRAWINGS

The various novel features of this invention, along with the foregoing and other objects, as well as the invention itself, both as to its organization and method of operation, may be more fully understood from the following description of illustrated embodiments when read in conjunction with the accompanying drawing, wherein:

FIG. 2 is a diagrammatic perspective view of a section of an interleaved magnetic head that uses the elements of the present invention;

FIG. 6 shows write saturation characteristic curves at different wavelengths comparing the configuration of the present invention of FIG. 3 to the prior art of FIG 1A.

DETAILED DESCRIPTION OF THE EMBODIMENTS

Figure 1C:
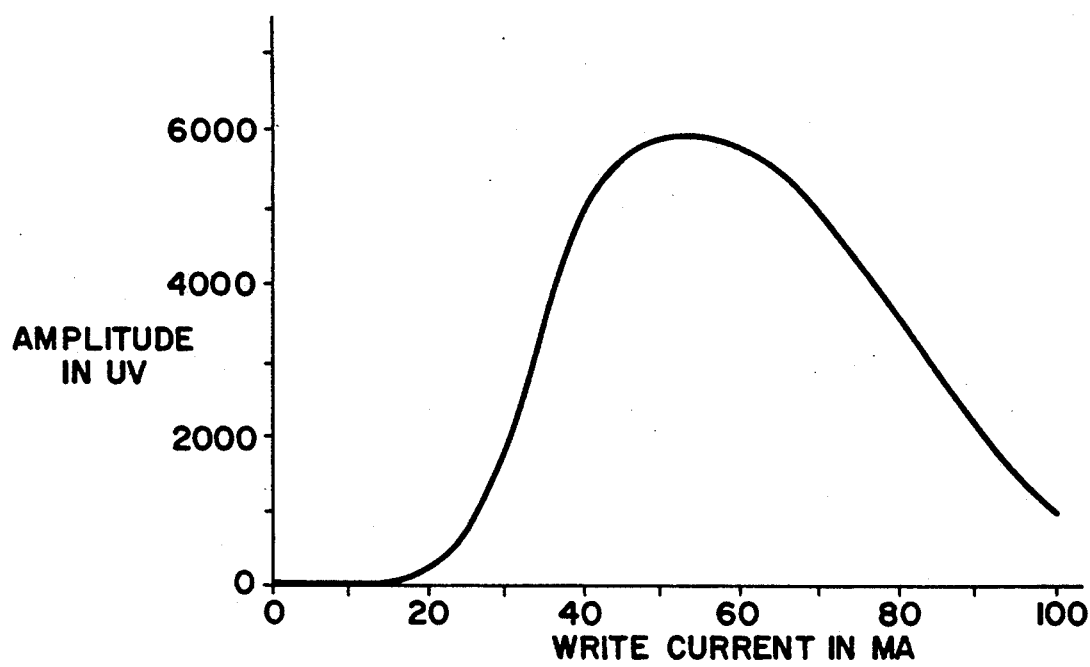
FIGS. 1C and D are curves showing a recording characteristic of prior art recording magnetic head.
Figure 1D:
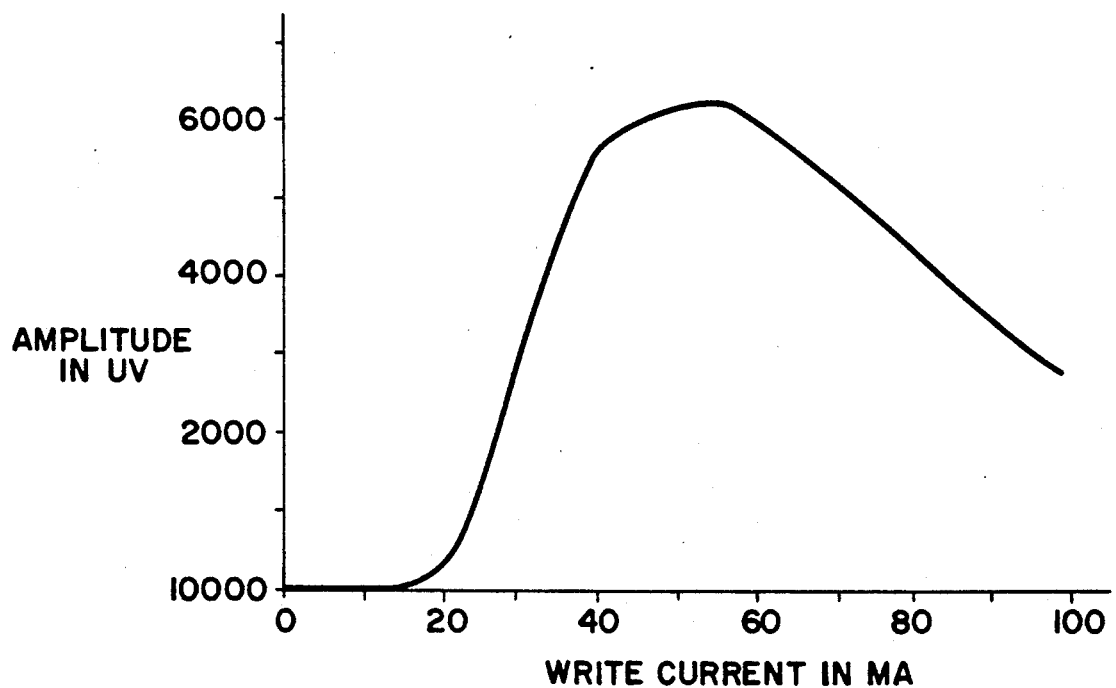
FIGS 1A and B are sectional views of prior art thin film recording magnetic heads.

The present invention is preferable for use in an interleaved magnetic head. The interleaved magnetic head is used to read and write magnetic transitions from a multitrack media. This, in turn, finds its major usage in tape drive systems. A typical tape drive system, well known today, is the IBM 3490 tape drive. In a tape drive system, the transducer generally remains fixed and the tape is moved across the transducer in both directions to read and write from various transducers in the magnetic head to record data information onto at least one of a plurality of tracks on the media. The interleaved head is of particular importance since the number of tracks can be increased while still providing the bi-directional operation of the media and also permitting a immediate read back check of the data just written onto the media. Reference is made to the U.S. Pat. No. 4,125,881 to Eige, et al., and assigned to the assignee of the present invention for a more complete description of a reel-to-reel tape drive and its control which is useful together with the interleaved magnetic head of the present invention. An example of a tape drive for threading the tape media through a complex tape path is disclosed in U.S. Pat. No. 4,335,858 to Cranna, also assigned to the assignee of the present invention. An interleaved magnetic head is disclosed in U.S. Pat. No. 4,685,005 to Fields, and is also assigned to the assignee of the present invention. The disclosure in all of these patents is incorporated herein by reference for a more detailed description of the preferred embodiment. The magnetic head to be used in the practice of the present invention can take the form of any of a number of thin film construction types and arrangements. By the use of photolithography, it is possible to maximize use of the surface of the magnetic media, since narrow, closely placed tracks can be written.

In the preferreed embodiment of a thin film magnetic recording head, as is shown in FIG. 2, an interleaved magnetic head 10 is preferable. The read elements are marked R for the magnetic head 10, while the write transducers are marked W. The read and write gaps are used in immediately alternating, odd/even fashion. The term alternating is intended to include other formats. For example, it is the preferred embodiment of the present invention to provide a format of 72 tracks across the width of the media, hereinafter called tape media. One format provides that the odd numbered tracks, tracks 1, 3, 5, and so-forth, are operated during forward tape movement, while the even numbered tracks 2, 4, 6, and so-forth, are operative during the opposite direction of the movement of the tape media.

In general, referring to FIG. 2, the length of the magnetic tape 12 moves in both a forward and reverse direction as indicated by arrows 14 and 16. The arrow 14 designates the forward movement direction of the tape 12 and the arrow 16 designates the reverse direction. The magnetic tape 12 operates in transducing contact relationship with the magnetic head 10 in the standard well known format. The magnetic head 10 includes two modules 18 and 20 of generally identical construction. These two modules are bonded together to form a single physical unit. In this manner, the transducing gaps of one module are not only closely spaced to the transducing gaps of the other modules, but also the module gaps are accurately aligned in the direction of tape movement. There are 36 read transducers and 36 write transducers in each of the modules 18 and 20. The magnetic tape 12, therefore, has 72 tracks across its one-half inch width. Each of the modules 18 and 20 include a magnetic ferrite substrate 22 and a non-magnetic ceramic closure piece 24. Each module includes one gap line 26 for module 18 and one gap line 28 for module 20 to form the single physical unit of the magnetic head 10. Reference is made to the aforementioned U.S. Pat. No. 4,685,005 for a more detailed description of the preferred embodiment as adapted to an interleaved magnetic head. Reference is also made to an IBM Technical Disclosure Bulletin to Franklin et al, Vol. 18, No. 6, Nov. 1975, at page 1981, for a method of isolating-blocks of magnetic ferrite to form multitrack write elements.

Figure 3:
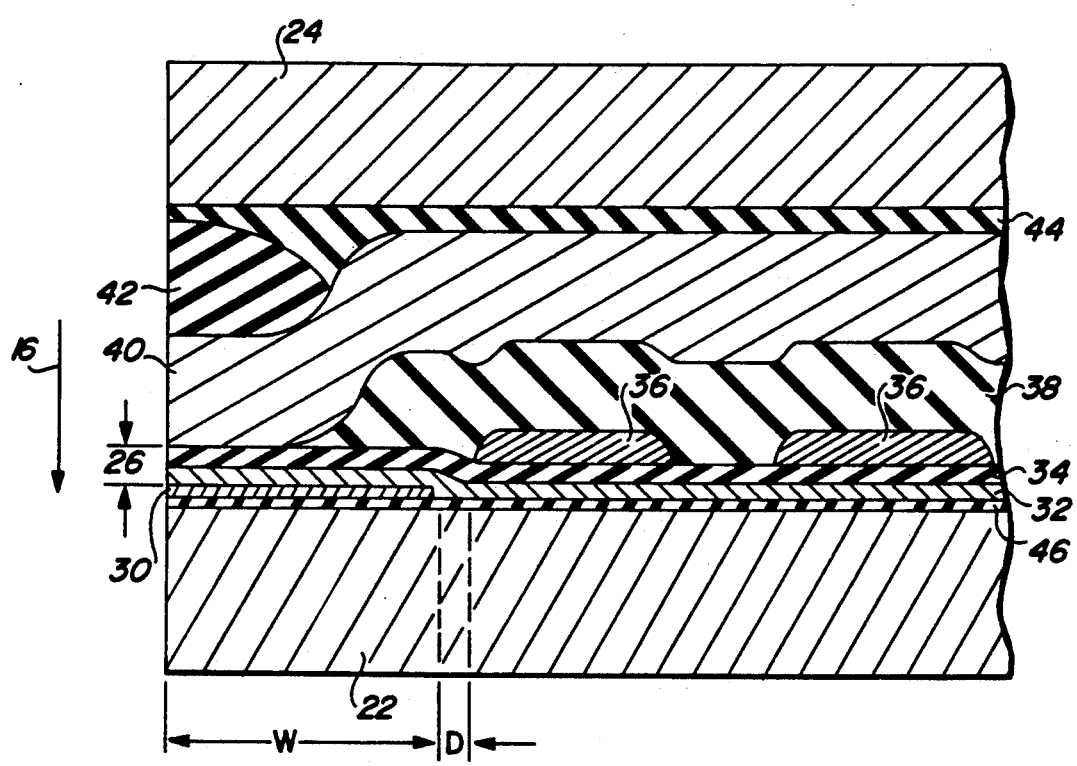
FIG. 3 is a sectional view of a write element of the interleaved magnetic head shown in FIG. 2 and taken along lines 3—3.

FIG. 3 is a cross-sectional view taken along lines 3—3 of FIG. 2 and discloses the enhanced pole pieces according to the present invention. The write transducer of the present invention is shown encompassed between the magnetic ferrite substrate 22 and the non-magnetic ceramic closure block 24. The same reference numerals are used in the drawings to indicate like structural features and operation in the various figures. The magnetic ferrite substrate 22 can be made from a magnetic nickel-zinc ferrite or a magnetic manganese-zinc ferrite or any of the magnetic ferrite materials known for use in magnetic heads. The non-magnetic closure 24 can be formed by any of the non-magnetic ceramics, such as non-magnetic ferrites and, again, the usage of non-magnetic ceramic materials in magnetic heads is well known. The write transducers in the interleaved head of FIG. 2 operate in the trailing magnetic ferrite mode direction and, thus, in the write operation of the transducer shown in FIG. 3, the tape media 12 operates in the direction shown in arrow 16. An etch stop layer 46, preferably of amorphous alumina at a 500 Angstrom thickness, is generally deposited to provide an etch stop layer for processing the deposition of subsequent layers and to provide a smoother surface for the next film. If this amorphous layer is not included, a replication of the ferrite grains may lead to crystal growth of an additional first poletip 30 and a rough film which might lead to non-uniform coverage of the subsequent thin film layers during further processing of the head. This etch stop layer 46 may be deleted if not required. A soft magnetic material, such as nickel-iron, is deposited and patterned using a photoresist mask and etch cycle to create the additional first poletip 30. The magnetic gap region 26 can include two layers of magnetic and electrical insulating layers 32 and 34, preferably of alumina. Activating conductor coil turns 36 are deposited onto the insulating gap layers 32 and 34. The conductor turns 36 can be made of an electrically conductive material, such as copper or gold. An electrically insulating material 38, such as a hardened photoresist, is deposited over the coil turns 36. A second thin film pole piece 40 of soft magnetic material, such as nickel-iron, is deposited over the gap region 26 and the insulating layer 38. A support insulating layer 42, preferably of a hardened photoresist is formed over the poletip section of the second pole piece 40. A leveling layer 44 of alumina and/or an epoxy material, for instance, is then formed over the second pole piece 40 and the support insulated layer 42. The leveling layer is then lapped flat. The support insulating layer 42 and the leveling layer 44 together provide a flat surface for the bonding of the non-magnetic ceramic closure 24 to produce the completed write transducing element. Both poletip 30 and polepiece 40 have a composition preferably of 80% nickel and 20% iron.

In the preferred embodiment, the additional poletip 30 of the first pole piece has a width W and extends very close to the first coil turn 36. Preferably, the difference D is within 2 micrometers of the first coil turn. This geometry is used to assure good adhesion of the additional poletip 30 to the magnetic substrate 22 and layer 46 and to prevent electrical shorts between the poletip 30 and the coil turns 36, especially at the edge of the poletip 30. The magnetic gap region 26 is located adjacent to the very hard magnetic ferrite substrate 22, which provides a low sensitivity to erosion of the magnetic gap 26, and also provides for higher recording density. The preferred embodiment of this invention uses a magnetic substrate 22 as the first pole piece together with the poletip 30 which extends very close to the first coil turn 36. The poletip 30 need only be approximately 5000 Angstroms in thickness in order to be adequate to write metal media of 1500 Oersteds which is a very high coercivity media known today. The magnetic gap 26 is preferably formed by the combined thicknesses of the layers 32 and 34, which also insulates the write coils 36 from the magnetic substrate 22. In the preferred embodiment, the thin film layer 46 of alumina on the order of 200 to 500 Angstroms thickness is deposited over the substrate 22 before the deposition of the soft magnetic material of the poletip 30. In FIG. 3, the poletip 30 is shown in the preferred embodiment having a width W and extending a distance D from the first coil winding 36. The additional poletip 30 may cover the entire surface of the substrate 22 that provides the ferrite portion of the first pole piece up to the back gap region (not shown). The limitation of the width W of the poletip 30 is that it must be wide enough to provide the write saturation characteristics required and to assure good adhesion to the substrate 22 such that, preferably at zero throat height, approximately 12 micrometers of additional poletip 30 is still present FIG. 4 illustrates a likely BS erosion profile for the write element of FIG. 3.

Figure 4:
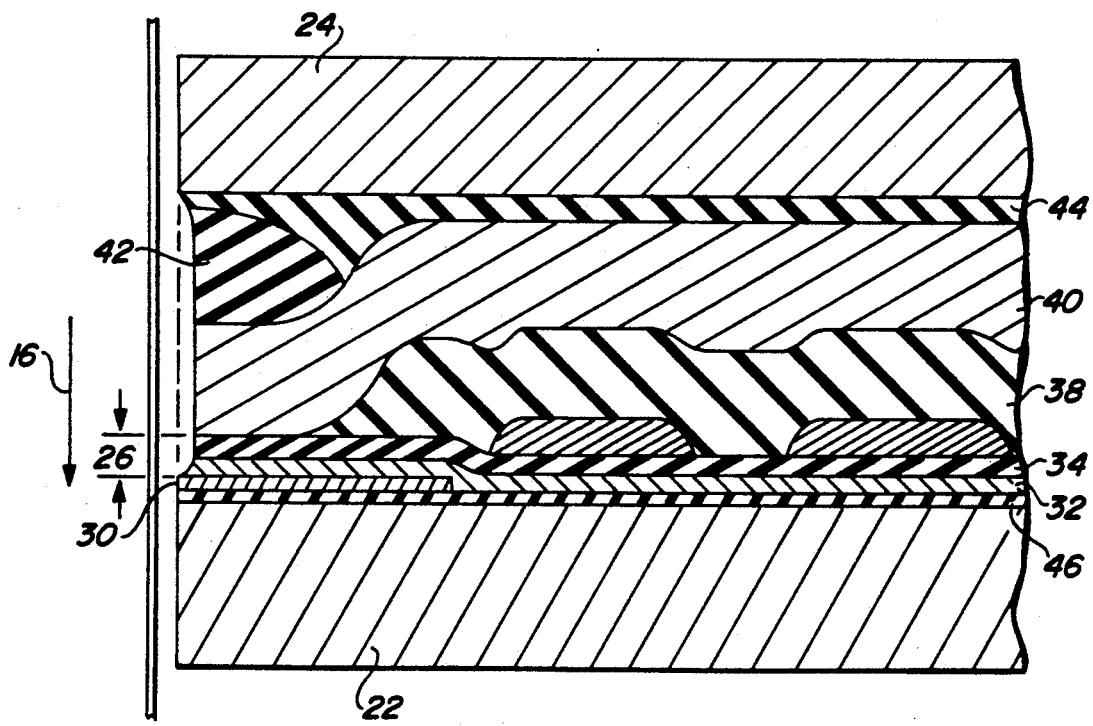
FIG. 4 is a sectional view of the write transducer of FIG. 3 showing its wear pattern after contact recording with a recording media.

Referring to FIG. 4, the profile of the magnetic tape path over the write element is shown in a dotted line. The functional area of the magnetic gap 26 is very close to the hard magnetic ferrite surface of the substrate 22. The additional thin poletip 30 provides the capability of very high recording density even with the substantial erosion of the magnetic gap 26 as can be expected in normal usage.

As shown in FIG. 3, the additional poletip 30 must cover a surface such that the poletip 30 will not saturate. Preferably, the width W of the stripe of the poletip 30 must be at least approximately 12 micrometers in width. Too short of a width may cause the poletip 30 to saturate with the write current and will decrease the write transducer's ability to form transitions on high coercivity magnetic tape, with extremely thick polepiece formed with the substrate 22. The poletip 30 may extend over the entire surface of the magnetic ferrite substrate 22 that forms the pole pieces of FIG. 3 for a single track. The poletip 30 in this embodiment will then extend from the air bearing surface beneath the tape to the back gap (not shown) of the magnetic circuit.

Figure 5A:
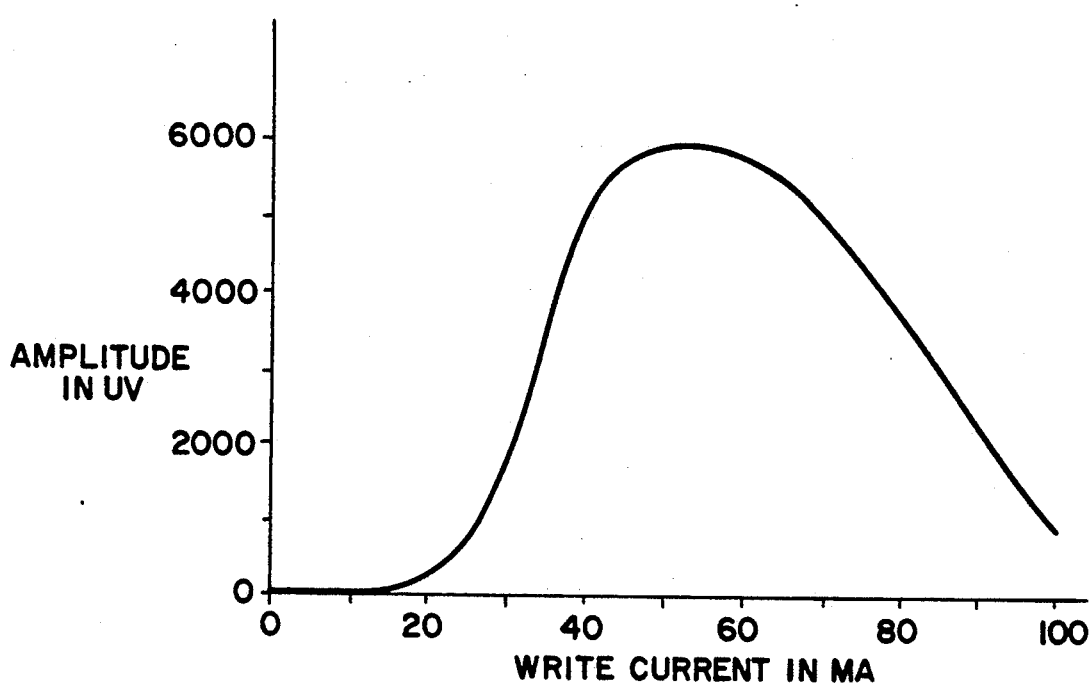
FIGS. 5A and 5B are curves showing the output read amplitude of the same head without and with the present invention head, respectively.
Figure 5B:
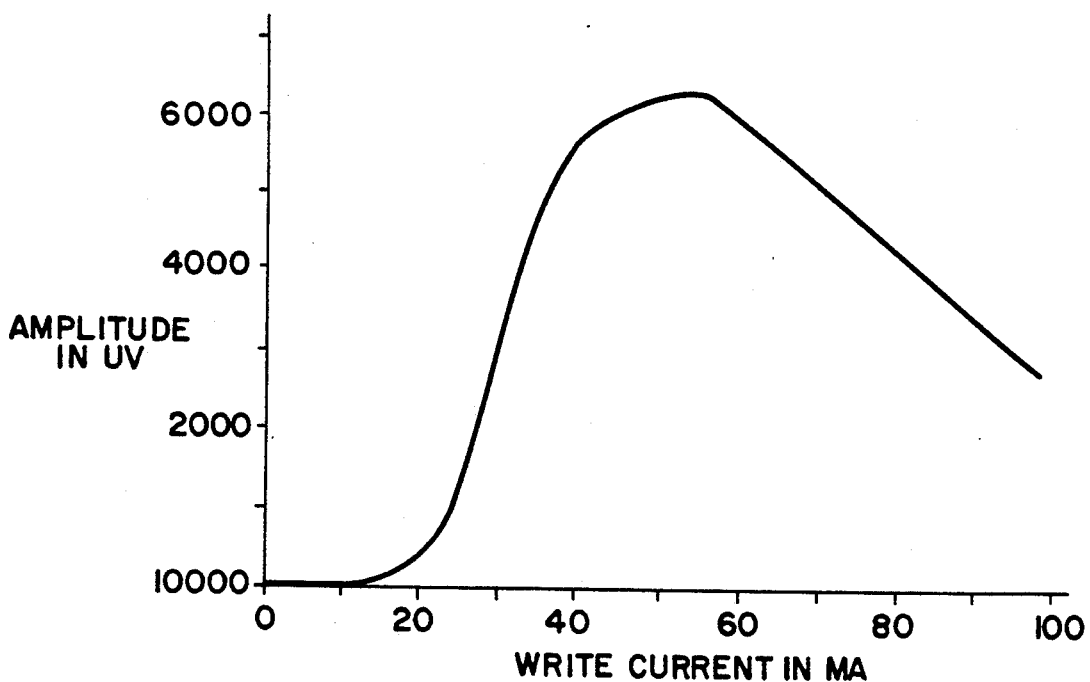

FIG. 5A shows the write saturation characteristic for the prior art magnetic ferrite-trailing mode. FIG. 5B shows the trailing mode of the present invention. The magnetic ferrite material as shown in FIG. 5A shows a severe amplitude loss at a high write current, 100 milliamperes in the curve. The microvolt amplitude output decreases to below 1000 microvolts when the write current is 100 milliamperes. The write current is applied to a write head having the same configuration as shown in FIG. 3 without the soft magnetic stripe additional poletip 30. The writing is executed on standard magnetic tape, such as the IBM 3490 tape drive magnetic tape. The data is then read by a magnetic read head of the IBM 3490 tape drive design.

Using the deposited poletip design for the write magnetic head of the present invention produced an output as is shown in FIG. 5B. The same read head was used as for FIG. 5A. At a high write current of 100 milliamperes, the amplitude produced by the read head was close to 3000 microvolts, a decided improvement. The improvement is attributed to the higher saturation moment Bs of the soft magnetic film versus the magnetic ferrite block.

FIG. 6 shows that the characteristics of the magnetic head according to the present invention matches closely the advantages of the write saturation characteristics for the thin film head as shown in FIG 1A. Curves A show a curve 100 for the additional poletip stripe 30 of the present invention and a curve 102 for the deposited poletip of the head shown in FIG 1A. Curves A were taken for an applied wavelength of 744 flux changes per millimeter. Curves B show a curve 104 for the additional poletip stripe of the present invention and a curve 106 for the deposited poletip of FIG. 1A. Curves B were obtained for an applied wavelength of 972 flux changes per millimeter of tape length. Curves C show a curve 108 for the additional poletip stripe 30 of the present invention and a curve 110 for the deposited poletip of FIG 1A; both curves were obtained when operating at a wavelength of 1488 flux changes per millimeter. Curves D include a curve 112 for the additional poletip 30 of the present invention and a curve 114 for the deposited poletips of FIG 1A. Again, both curves were taken at the same wavelength, this time at a wavelength of 1944 flux changes per millimeter.

It is clear from the curves A-D that the performance of the present invention matches the advantages of the performance of thin film pole pieces in write saturation characteristics, even at different wavelength operations. The magnetic head of the present invention offers the advantages of the performance of a thin film head while retaining the wear characteristics of a magnetic ferrite head to keep magnetic gap erosion at a minimum.

The principals of the present invention have now been made clear in an illustrated embodiment. There will be, immediately obvious to those skilled in the art, many modifications of the structure, arrangement, proportions, the elements, materials, and components used in the practice of the invention. For instance, it is obvious that many different materials can be used for the thin film magnetic pole pieces and for the gap and other insulating materials used in the magnetic head of the preferred embodiment. The appended claims are, therefore, intended to cover and embrace any such modifications within the limits only of the true spirit and scope of the invention.

What is claimed is:

1. A magnetic head assembly comprising:
   a supporting substrate of a magnetic material with a contact recording medium bearing surface provided at an edge of said substrate,
   a first thin layer of a magnetically soft material on said substrate, said first thin film layer having an edge providing a contact recording medium bearing surface, said first thin film layer and said supporting substrate forming a first bottom pole piece for the magnetic head assembly with a magnetic flux path through the supporting substrate to said first thin film layer;
   a magnetic transducing gap forming insulation layer with an edge providing a contact recording medium bearing surface, said gap layer covering said first thin film layer and said substrate;
   a conductor coil placed on said magnetic gap layer recessed from the bearing surface edge of said gap layer;
   a coil insulating layer covering said conductor coil and extending partially from said coil to the bearing surface edge of said gap layer;
   a second thin film layer of magnetically soft material insulated from said conductor coil and connected at a back gap to said substrate, said second thin film layer having an edge providing a contact recording medium bearing surface and forming a second top pole piece for the magnetic head assembly;
   a leveling layer of an insulating material covering said second pole piece and having an edge providing a contact recording medium bearing surface;
   a closure block of a non-magnetic ceramic bonded to said leveling insulating layer and having an edge providing a contact recording medium bearing surface; and
   said edge of said first thin film layer, said magnetic transducing gap forming insulation layer, and said second thin film layer forming said magnetic transducing gap at said contact recording medium bearing surface, said first thin film layer extending from said bearing surface toward said conductor coil a distance greater than 80% of the distance from said bearing surface to said conductor coil, but less than the distance from said bearing surface to said conductor coil.

2. A magnetic head assembly as defined in claim 1 wherein said substrate and said first thin film layer, and said second thin film layer, form first and second pole pieces of a write transducer and further including a read transducer formed adjacent to said write transducer.

3. A magnetic head assembly as defined in claim 2 including a plurality of alternating write and read transducers which form one module.

4. A magnetic head assembly as defined in claim 2 wherein the read transducer is a magnetoresistive element.

5. A magnetic head assembly as defined in claim 3 including a second module bonded together such that a write transducer of one module is opposite a read transducer of the second module to form an interleaved magnetic head.

6. A magnetic head assembly as defined in claim 1 wherein said second pole piece includes an outer surface, furthest from said magnetic transducing gap, which is approximately perpendicular to said bearing surface.

7. A magnetic head assembly as defined in claim 6 wherein said first thin layer has a thickness of approximately 5000 Angstroms.

8. A magnetic head assembly as defined in claim 6 wherein the distance between said first thin film layer and said conductor coil is approximately 2 micrometers.

9. A magnetic head assembly as defined in claim 1 further including an undercoat layer on said substrate for separating said substrate from said first thin film layer.

10. A magnetic head assembly comprising:
 a first bottom pole piece of a block of ferrite magnetic material with an undercoat layer thereon and a first thin film layer of a magnetically soft material formed on the undercoat layer, said undercoat layer for seperating the first thin film layer from the ferrite material, said bottom pole piece having a front edge providing a recording medium bearing surface and having a magnetic flux path through said ferrite material to said first thin film layer;
 a magnetic transducing gap of a magnetic insulating material having a front edge providing a recording medium bearing surface;
 a second top pole piece of a second thin film layer of a magnetically soft material covering the magnetic insulating material and having a front edge providing a recording medium bearing surface;
 said front edge of said first thin film layer, said magnetic insulating material, and said second thin film layer forming said magnetic transducing gap at said contact recording medium bearing surface, said second pole piece connected to said first pole piece at a back gap;
 a conductor coil on said magnetic insulating material recessed behind said front edge, formed around the back gap and magnetically activating said first and second pole pieces;
 said first thin film layer having a thickness sufficient to provide flux to write on the recording medium and extending from said front edge toward said conductor coil a distance great enough to provide write saturation of the recording medium, but less than the distance from said front edge to said conductor coil;
 a coil insulating layer recessed behind said front edge and covering said conductor coil; and
 a block of non-magnetic ceramic material placed adjacent said second pole piece.

11. A magnetic head assembly as defined in claim 10 including a plurality of alternating write and read transducers which form one module.

12. A magnetic head assembly as defined in claim 11 wherein each read transducer is a magnetoresistive element.

13. A magnetic head assembly as defined in claim 11 including a second module bonded together such that a write transducer of one module is opposite a read transducer of the second module to form an interleaved magnetic head.

14. A magnetic head assembly as defined in claim 10 wherein said second pole piece includes an outer surface, furthest from said magnetic transducing gap, which is approximately perpendicular to said bear surface.

15. A magnetic head assembly as defined in claim 14 wherein said first thin layer has a thickness of approximately 5000 Angstroms.

16. A magnetic head assembly as defined in claim 15 wherein the distance between said first thin film layer and said conductor coil is approximately 12 micrometers.

17. A magnetic head assembly as defined in claim 10 wherein said first and second pole pieces form a write transducer, and further including a read transducer formed adjacent to said write transducer.

18. An interleaved magnetic head comprising:
 a first and second module bonded together, each module having a plurality of alternating read and write transducers formed thereon, with each read and write transducer of the first module opposite each write and read transducer, respectively, of the second module, each of said write transducers including:
 a first bottom pole piece of a block of ferrite magnetic material with an undercoat layer thereon and a first thin film layer of a magnetically soft material deposited on the undercoat layer, said undercoat layer for seperating the first thin film layer from the ferrite material, said bottom pole piece having a front edge providing a recording medium bearing surface and having a magnetic flux path through said ferrite material to said first thin film layer;
 a magnetic transducing gap of a magnetic insulating material having a front edge providing a recording medium bearing surface;
 a second top pole piece of a second thin film layer of a magnetically soft material covering the magnetic insulating material and having a front edge providing a recording medium bearing surface;
 said front edge of said first thin film layer, said magnetic insulating material and said second thin film layer forming said magnetic transducing gap at said contact recording medium bearing surface, said second pole piece connected to said first pole piece at a back gap;
 a conductor coil on said magnetic insulating material recessed behind said front edge and formed around the back gap and magnetically activating said first and second pole pieces;
 said first thin film layer having a thickness sufficient to provide the flux to write on the recording medium and extending from said front edge toward said conductor coil a distance great enough to provide write saturation of the recording medium, but less than the distance from said front edge to said conductor coil;

a coil insulating layer recessed behind said front edge and covering said conductor coil;

a leveling layer of a non-magnetic material covering said second pole piece; and a block of non-magnetic ceramic material covering said leveling layer.

19. A magnetic head assembly as defined in claim 18 wherein each read transducer is a magnetoresistive element.

20. A magnetic head assembly as defined in claim 18 wherein said second pole piece includes an outer surface, furthest from said magnetic transducing gap, which is approximately perpendicular to said bearing surface.

21. A magnetic head assembly as defined in claim 20 wherein said first thin layer has a thickness of approximately 5000 Angstroms.

22. A magnetic head assembly as defined in claim 20 wherein the distance between said first thin film layer and said conductor coil is approximately 2 micrometers.

23. A magnetic head comprising:

a magnetic substrate having a bearing for a recording medium contacting the magnetic head;

a first poletip forming layer deposited on said substrate, said first pole tip layer having a bearing edge for the recording medium, said substrate and said poletip forming layer forming a first bottom pole piece with a magnetix flux path through said substrate to said first poletip layer;

a magnetic transducing gap layer and having a bearing edge for the recording medium;

a second top thin film pole piece covering said gap layer and having a bearing edge for the recording medium;

said bearing edge of said first poletip forming layer, said magnetic gap layer, and said second pole piece forming a magnetic transducing gap adjacent the contact recording medium surface;

a conductor coil on said magnetic gap layer and insulated from said first pole piece by said gap layer and from said second pole piece by an insulating material;

a conductor coil insulating layer covering said conductor coil; and said first pole tip layer having a thickness sufficient to provide flux to write on the recording medium and extending from said bearing edge toward said conductor coil a distance great enough to provide sufficient flux to write saturate the recording medium, but less than the distance from said bearing edge to said conductor coil;

a non-magnetic closure layer placed next to said second pole piece.

24. A magnetic head assembly as defined in claim 23 wherein said second pole piece includes an outer surface, furthest from said magnetic gap layer, which is approximately perpendicular to said bearing edge.

25. A magnetic head assembly as defined in claim 23 wherein said first poletip forming layer has a thickness of approximately 5000 Angstroms.

26. A magnetic head assembly as defined in claim 23 wherein the distance between said first poletip forming layer and said conductor layer is approximately 2 micrometers.

27. A magnetic head assembly as defined in claim 23 wherein said non-magnetic closure layer comprises:

a poletip protection layer of a non-magnetic material formed on the poletip end of said second pole piece;

a leveling layer covering said poletip protection layer and said second pole piece; and a closure block of ceramic material covering said leveling layer.

* * * * *

UNITED STATES PATENT AND TRADEMARK OFFICE
CERTIFICATE OF CORRECTION

PATENT NO. :   5,296,993
DATED      :   March 22, 1994
INVENTOR(S) :  Joseph A. Aboaf, et al.

It is certified that error appears in the above-identified patent and that said Letters Patent is hereby corrected as shown below:

At column 3, line 9, after "having", delete ","; at line 54, "therefor" should be --therefore,--; at line 54, after "therefore," insert --is to--.

At column 5, line 44, "isolating-blocks" should be --isolating blocks--.

At column 7, line 19, after "tape", insert --even--.

At column 11, line 26, after "bearing", insert --edge--.

Signed and Sealed this

Twentieth Day of September, 1994

Attest:

BRUCE LEHMAN

*Attesting Officer*    Commissioner of Patents and Trademarks

UNITED STATES PATENT AND TRADEMARK OFFICE
CERTIFICATE OF CORRECTION

PATENT NO. :     5,296,993
DATED      :     March 22, 1994
INVENTOR(S):     Joseph A. Aboaf, et al.

It is certified that error appears in the above-identified patent and that said Letters Patent is hereby corrected as shown below:

At column 3, line 10, after "recording", insert --head--.

At column 9, line 39, "seperating" should be --separating--.

At column 10, line 44, "seperating" should be --separating--.

At column 11, line 32, "magnetix" should be --magnetic--.

Signed and Sealed this

Twenty-second Day of November, 1994

Attest:

BRUCE LEHMAN

Attesting Officer      Commissioner of Patents and Trademarks